US011983920B2

(12) United States Patent
Ratner et al.

(10) Patent No.: US 11,983,920 B2
(45) Date of Patent: May 14, 2024

(54) UNIFIED FRAMEWORK FOR MULTIGRID NEURAL NETWORK ARCHITECTURE

(71) Applicant: International Business Machines Corporation, Armonk, NY (US)

(72) Inventors: Vadim Ratner, Haifa (IL); Yoel Shoshan, Haifa (IL); Flora Gilboa-Solomon, Haifa (IL)

(73) Assignee: International Business Machines Corporation, Armonk, NY (US)

(*) Notice: Subject to any disclaimer, the term of this patent is extended or adjusted under 35 U.S.C. 154(b) by 407 days.

(21) Appl. No.: 17/556,011

(22) Filed: Dec. 20, 2021

(65) Prior Publication Data

US 2023/0196750 A1 Jun. 22, 2023

(51) Int. Cl.
*G06V 10/82* (2022.01)
*G06N 3/045* (2023.01)
*G06V 10/764* (2022.01)

(52) U.S. Cl.
CPC .............. *G06V 10/82* (2022.01); *G06N 3/045* (2023.01); *G06V 10/764* (2022.01)

(58) Field of Classification Search
CPC ...... G06V 10/82; G06V 10/764; G06V 10/52; G06V 10/454; G06V 30/19173; G06V 10/25; G06V 20/10; G06V 2201/03; G06V 30/194; G06N 3/045; G06N 3/08; G06N 3/084; G06N 3/04; G06N 3/048; G06T 2207/20084; G06T 2207/20081; G06T 7/11; G06T 2207/20016; G06T 7/143; G06T 2207/10028; G06T 2207/10081;

(Continued)

(56) References Cited

U.S. PATENT DOCUMENTS 10,929,674 B2 * 2/2021 Song .................... G06V 10/82
10,979,622 B2 * 4/2021 Wang ................... G06V 10/764

(Continued)

FOREIGN PATENT DOCUMENTS

CN 112541904 A 3/2021
CN 113205523 A 8/2021
WO 2023119078 A1 6/2023

OTHER PUBLICATIONS

Hu Cao et al, "Swin-Unet: Unet-like Pure Transformer for Medical Image Segmentation"; Online at: https://arxiv.org/abs/2105.05537, May 12, 2021.

(Continued)

*Primary Examiner* — Michael S Osinski
(74) *Attorney, Agent, or Firm* — L. Jeffrey Kelly

(57) ABSTRACT

A method including: receiving, as input, an image; providing a neural network structure including a plurality of multilayer multi-scale neural networks, wherein the plurality of multilayer multi-scale neural networks are arranged sequentially, by laterally connecting corresponding scale-level layers between each two adjoining multilayer multi-scale neural networks in the sequence; and at a training stage, training the neural network structure on a training dataset, to obtain a trained machine learning model configured to perform a computer vision task which includes outputting at least one of: (i) a classification of the image into one class of a set of two or more classes, (ii) a segmentation of a least one object in the image, and (iii) a detection of at least one object in the image.

20 Claims, 8 Drawing Sheets

(58) Field of Classification Search
CPC . G06T 2207/10088; G06T 2207/10116; G06T 3/18; G06T 3/4046; G06T 5/60

See application file for complete search history.

(56) References Cited

U.S. PATENT DOCUMENTS

| | | | | |
|---|---|---|---|---|
| 11,587,231 | B2* | 2/2023 | Liu | G06T 3/4046 |
| 11,593,587 | B2* | 2/2023 | Lee | G06T 7/11 |
| 11,669,781 | B2* | 6/2023 | Han | G06N 5/04 706/12 |
| 2016/0104056 | A1* | 4/2016 | He | G06N 3/04 382/158 |
| 2019/0057507 | A1* | 2/2019 | El-Khamy | G06V 20/10 |
| 2019/0066130 | A1* | 2/2019 | Shen | G06Q 30/0202 |
| 2019/0073568 | A1 | 3/2019 | He | |
| 2019/0205758 | A1* | 7/2019 | Zhu | G06T 7/13 |
| 2019/0333222 | A1* | 10/2019 | Gatti | G06T 7/143 |
| 2020/0051238 | A1* | 2/2020 | El Harouni | G06T 7/0012 |
| 2020/0092463 | A1* | 3/2020 | Wang | G06V 10/82 |
| 2020/0111214 | A1* | 4/2020 | Chen | G06N 3/08 |
| 2020/0143205 | A1 | 5/2020 | Yao | |
| 2020/0184647 | A1 | 6/2020 | Harrison | |
| 2020/0202533 | A1* | 6/2020 | Cohen | G06T 7/194 |
| 2020/0210764 | A1 | 7/2020 | Hamedi | |
| 2020/0356827 | A1* | 11/2020 | Dinerstein | G06T 3/4007 |
| 2020/0356842 | A1* | 11/2020 | Guo | G06V 20/20 |
| 2021/0118146 | A1* | 4/2021 | Rhodes | G06N 3/045 |
| 2021/0166092 | A1* | 6/2021 | Mabyalaht | G06V 30/194 |
| 2021/0248427 | A1* | 8/2021 | Guo | G06V 10/82 |
| 2021/0256386 | A1* | 8/2021 | Wieman | G06N 3/044 |
| 2021/0303935 | A1* | 9/2021 | Ma | G06F 18/241 |
| 2021/0319340 | A1* | 10/2021 | Shabtay | G06N 5/04 |
| 2021/0358296 | A1* | 11/2021 | Lee | G06T 7/246 |
| 2022/0164926 | A1* | 5/2022 | Kurmanov | G06T 5/70 |
| 2022/0222786 | A1* | 7/2022 | Ke | G06T 5/70 |
| 2022/0236452 | A1* | 7/2022 | Choi | G01W 1/14 |
| 2022/0383525 | A1* | 12/2022 | Sabato | G06V 10/751 |
| 2023/0127939 | A1* | 4/2023 | Zhu | G06T 5/60 382/131 |
| 2023/0326169 | A1* | 10/2023 | Samala | G06V 10/82 382/157 |
| 2023/0368493 | A1* | 11/2023 | Hou | G06N 3/084 |
| 2024/0062426 | A1* | 2/2024 | Houlsby | G06T 7/97 |

OTHER PUBLICATIONS

Jeya Maria Jose Valanarasu et al, "Medical Transformer: Gated Axial-Attention for Medical Image Segmentation"; Online at: https://arxiv.org/abs/2102.10662, Jul. 6, 2021.

Juncai He et al, "MgNet: A Unified Framework of Multigrid and Convolutional Neural Network"; Online at: https://arxiv.org/abs/1901.10415, Jan. 29, 2019.

Olaf Ronneberger et al, "U-Net: Convolutional Networks for Biomedical Image Segmentation"; Online at: https://arxiv.org/pdf/1505.04597v1.pdf, May 18, 2015.

Sankar Ganesh Sundaram et al, "Deep Transfer Learning Based Unified Framework for COVID19 Classification and Infection Detection from Chest X-Ray Images"; Arabian Journal for Science and Engineering, Aug. 11, 2021.

Tsung-Wei Ke et al, "Multigrid Neural Architectures" Online at: https://arxiv.org/abs/1611.07661, Nov. 23, 2016.

Tsung-Yi Lin et al, "Feature Pyramid Networks for Object Detection"; Online at: https://arxiv.org/pdf/1612.03144v2.pdf, Apr. 19, 2017.

Xianzhi Du et al, "SpineNet: Learning Scale-Permuted Backbone for Recognition and Localization"; Online at: https://arxiv.org/pdf/1912.05027v3.pdf, Jun. 17, 2020.

Ze Liu et al, "Swin Transformer: Hierarchical Vision Transformer using Shifted Windows"; Online at: https://arxiv.org/abs/2103.14030, Aug. 17, 2021.

Ze Liu et al, "Video Swin Transformer"; Online at: https://arxiv.org/abs/2106.13230, Jun. 24, 2021.

Zhenda Xie et al, "Self-Supervised Learning with Swin Transformers"; Online at: https://arxiv.org/abs/2105.04553, May 11, 2021.

He et al., "Deep Residual Learning for Image Recognition", arXiv:1512.03385v1 [cs.CV] Dec. 10, 2015, pp. 1-12.

https://github.com/microsoft/Swin-Transformer, "microsoft / Swin-Transformer", This is an official implementation for "Swin Transformer: Hierarchical Vision Transformer using Shifted Windows", Accessed on Mar. 5, 2024, 9 pages.

International Search Report and Written Opinion of the International Searching Authority, Date of mailing Mar. 24, 2023, International application No. PCT/IB2022/062271, 9 pages.

Liu et al., "Swin Transformer: Hierarchical Vision Transformer using Shifted Windows", arXiv:2103.14030v2 [cs.CV] Aug. 17, 2021, 14 pages.

Moradi et al., "MFP-Unet: A novel deep learning based approach for left ventricle segmentation in echocardiography", Physica Medica vol. 67, Nov. 2019, 5 pages.

Steiner et al., "How to train your ViT? Data, Augmentation, and Regularization in Vision transformers", Published in Transactions on Machine Learning research (May 2022), arXiv:2106.10270v2 [cs.CV] Jun. 23, 2022, 16 pages.

Xia et al., "W-Net: A Deep Model for Fully Unsupervised Image Segmentation", arXiv:1711.08506v1 [cs.CV] Nov. 22, 2017, pp. 4321-4333.

Yao et al., "CLAWU-Net: A Unet-Based Network With Deep Feature Concatenation for Scleral Blood Vessel Segmentation", arXiv:2010.10163v1 [eess.IV] Oct. 20, 2020, 5 pages.

Zhang et al., "MUNet: A Multi-scale U-Net Framework for Medical Image Segmentation", IEEE, Accessed on Mar. 4, 2024, 7 pages.

* cited by examiner

UNIFIED FRAMEWORK FOR MULTIGRID NEURAL NETWORK ARCHITECTURE

BACKGROUND

The invention relates generally to the field of artificial intelligence.

The basic architectural design of typical convolutional neural networks (CNNs), which drive state-of-the-art computer vision systems, propagates information from a high-resolution input image to lower-scale features. This way, every element in an image only receives information from other elements of the same or lower scale (i.e., closer to pixel-level), from a neighborhood defined by filter support. Thus, the first layer in a standard CNN consists of filters independently looking at small, almost meaningless regions of the image, devoid of any coarse-scale context. As a result, early layers cannot see coarser scales, while later layers see only them. For tasks requiring fine-scale output, such as semantic segmentation, this necessitates specialized designs for reintegrating spatial information.

While providing multiple-scale context has been shown to improve performance, common mechanisms for providing such context are limited to skips across some scales or simply in the down- or up-scale direction. In addition, such multiscale context typically requires localized manual annotation of the input image, which may not be readily available.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a system comprising at least one hardware processor; and a non-transitory computer-readable storage medium having stored thereon program instructions, the program instructions executable by the at least one hardware processor to: receive, as input, an image, provide a neural network structure comprising a plurality of multilayer multi-scale neural networks, wherein the plurality of multilayer multi-scale neural networks are arranged sequentially, by laterally connecting corresponding scale-level layers between each two adjoining multilayer multi-scale neural networks in the sequence, and at a training stage, training the neural network structure on a training dataset, to obtain a trained machine learning model configured to perform a computer vision task which comprises outputting at least one of: (i) a classification of the image into one class of a set of two or more classes, (ii) a segmentation of a least one object in the image, and (iii) a detection of at least one object in the image.

There is also provided, in an embodiment, a computer-implemented method comprising: receiving, as input, an image; providing a neural network structure comprising a plurality of multilayer multi-scale neural networks, wherein the plurality of multilayer multi-scale neural networks are arranged sequentially, by laterally connecting corresponding scale-level layers between each two adjoining multilayer multi-scale neural networks in the sequence; and at a training stage, training the neural network structure on a training dataset, to obtain a trained machine learning model configured to perform a computer vision task which comprises outputting at least one of: (i) a classification of the image into one class of a set of two or more classes, (ii) a segmentation of a least one object in the image, and (iii) a detection of at least one object in the image.

There is further provided, in an embodiment, a computer program product comprising a non-transitory computer-readable storage medium having program instructions embodied therewith, the program instructions executable by at least one hardware processor to: receive, as input, an image; provide a neural network structure comprising a plurality of multilayer multi-scale neural networks, wherein the plurality of multilayer multi-scale neural networks are arranged sequentially, by laterally connecting corresponding scale-level layers between each two adjoining multilayer multi-scale neural networks in the sequence; and at a training stage, training the neural network structure on a training dataset, to obtain a trained machine learning model configured to perform a computer vision task which comprises outputting at least one of: (i) a classification of the image into one class of a set of two or more classes, (ii) a segmentation of a least one object in the image, and (iii) a detection of at least one object in the image.

In some embodiments, each of the plurality of multilayer multi-scale neural networks comprises a bottom-up pathway and a top-down pathway, which compute feature maps of the input image at multiple scales.

In some embodiments, each of the plurality of multilayer multi-scale neural networks is one of: a U-Net neural network, a Feature Pyramid Network, and a SWIN U-Net neural network.

In some embodiments, the classification of the image into the one class of the set of two or more classes is obtained by training the neural network structure using a classification optimization scheme, using an output of a low-scale layer of a last one of the multilayer multi-scale neural networks in the sequence.

In some embodiments, the segmentation of a least one object in the image and the detection of at least one object in the image are each obtained by training the neural network structure using a segmentation optimization scheme, using an output of a high-scale layer of a last one of the multilayer multi-scale neural networks in the sequence. In some embodiments, the training comprises a training dataset comprising a plurality of images, wherein at least some of the plurality of images comprises pixel-level annotation.

In some embodiments, the segmentation of a least one object in the image and the detection of at least one object in the image are each obtained by training the neural network structure using a segmentation optimization scheme, using an output of a high-scale layer of a penultimate one of the multilayer multi-scale neural networks in the sequence. In some embodiments, the training comprises a training dataset comprising a plurality of images, wherein the plurality of images do not comprise pixel-level annotation.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
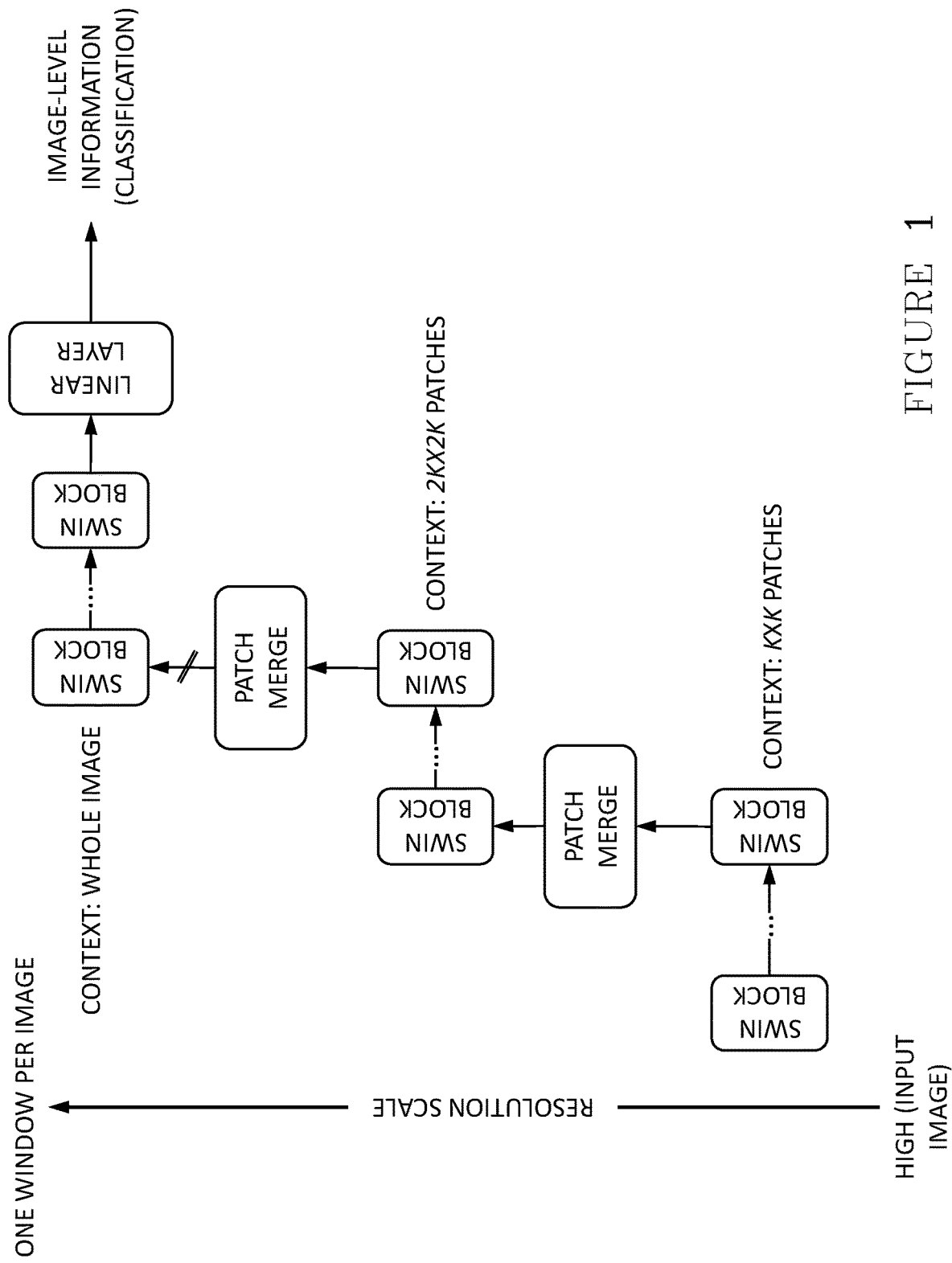
FIG. 1 is a schematic illustration of a SWIN convolutional neural network.

Disclosed herein is a technique, embodied in a system, computer-implemented method, and computer program product, which is optimized for executing multiple computer vision tasks, including, but not limited to, image-level explainable classification, object detection, and object segmentation, in an efficient and accurate manner. The described technique does not require localized annotation, thus significantly reducing the burden of preparing and annotating training materials.

In some embodiments, the present technique benefits from a neural network architecture, referred to herein as a Unified Multigrid Network (UMN) architecture, which is based on a series of existing multi-resolution networks (such as, but not limited to, U-Net, SWIN U-Net, and Feature Pyramid Networks). In the context of the present UMN architecture, multiple individual multilayer multi-scale units are arranged sequentially, end-to-end, with skip-layers connecting between corresponding scale-levels of neighboring multilayer units. Thus, every neuron in every layer in each of the multilayer units has access to information from all scales of the input image, e.g., from whole-image level to pixel-level.

In some embodiments, the present technique provides for the present UMN neural network architecture which is optimized for executing multiple computer vision tasks and image processing tasks, wherein information within the present neural network architecture propagates uniformly across all scale levels or layers, such that each element in the network architecture is simultaneously aware of multiple scale context. In some embodiments, the present UMN architecture may be applied to computer vision tasks such as image-level explainable classification, pixel-level segmentation, and/or object detection, based on image-level annotation and without the need for localized pixel-level annotation.

In some embodiments, the final unit in the sequence comprising the present UMN architecture may provide for at least two separate outputs—a low-scale output (e.g., at whole-image scale) and a high-scale output (e.g., at a single-pixel scale). In some embodiments, each of these outputs may be trained in a supervised, semi-supervised, or unsupervised manner, using, e.g., a suitable loss function, to perform a desired computer vision task.

Thus, for example, the present technique may utilize the present UMN architecture to perform an image-level classification task, by using the output from the low-scale, whole-image level output layer of the last multilayer unit in the sequence of units comprising the present UMN architecture. In this case, for example, pixel-level output from the penultimate multilayer unit may also be used in the task, e.g., in the context of an unsupervised segmentation task (e.g., based on clustering in representation/dimension, or representation/location dimension), to provide task-related segmentation or explainability of the image-level classification results.

Similarly, a supervised segmentation task may be executed using features output from a high-scale, pixel-level layer of the last multilayer unit in the architecture.

The following disclosure will discuss extensively applications of the present technique in conjunction with a variety of machine learning computer vision tasks. However, the present technique may be adapted to perform additional machine learning tasks, e.g., by incorporating transformer-based multilayer unit (such as SWIN U-Net) to handle non-computer vision tasks, such as multi-context textual analysis.

In some embodiments, the present disclosure provides for the present UMN architecture comprising two or more consecutive individual multilayer units arranged sequentially, with skip-layers connecting between corresponding scale-levels of neighboring multilayer units. Thus, the final multilayer unit in the architecture may provide for two or more different outputs, e.g., at least:

Low-scale, whole-image level output, and high-scale, pixel-level output.

In turn, each of these outputs can be assigned a specific loss function, which may be supervised or unsupervised, depending on the desired computer vision task to be performed.

For example, in whole-image classification tasks, the low-scale whole-image level output may be assigned a classification loss function. In such case, pixel-level output from the penultimate multilayer unit may also be output, and go through an unsupervised segmentation method (e.g. clustering in representation-dimension, or representation and location dimension), to provide task-related segmentation or explanation.

Alternatively, in a scenario where a classification task is being performed, but localized pixel-level annotation is available for at least some of the input images, a pixel-level detection output may be attached to the high-scale level of the last multilayer unit, with a loss function that only activates when segmentation information is available.

Optionally, other scale-level outputs are also possible, with their own respective trained loss functions. For example, the present UMN architecture allows for 'sidewise' information propagation across all scales (with information shared between scales within each multilayer unit). This is unlike the dominant up-scale or down-scale propagation of current methods.

FIG. 1 is a schematic illustration of a SWIN network (see Liu, Ze, et al. "Swin Transformer: Hierarchical Vision Transformer using Shifted Windows." ArXiv abs/2103.14030 (2021): n. pag.). Typically, processing begins on a high resolution input, of which filters examine small local pieces. Through stacking multiple layers, in combination with occasional pooling and subsampling, receptive fields slowly grow with depth, eventually encompassing the entire input. As can be seen in FIG. 1, the overall architecture splits an input image into non-overlapping patches. Multiple transformer 'SWIN blocks' are applied on these patches. To produce a hierarchical representation, the number of patches is reduced by patch merging layers as the network gets deeper. These stages jointly produce a hierarchical representation.

One of the drawbacks of this type of architecture is that, because information in SWIN only propagates upwards and sideways (i.e., from lower scale to higher scale), only the last layer may contain whole-image level context. For example, a single pixel in an image depicting an animal may represent a point on a lip of the animal, which point is within the animal's mouth region, which is turn is part of its head. However, the larger-scale contextual information single pixel→mouth-region→head will be missing from all but the last layer of the SWIN network, unless the input image has been annotated to indicate the context.

Figure 4A:
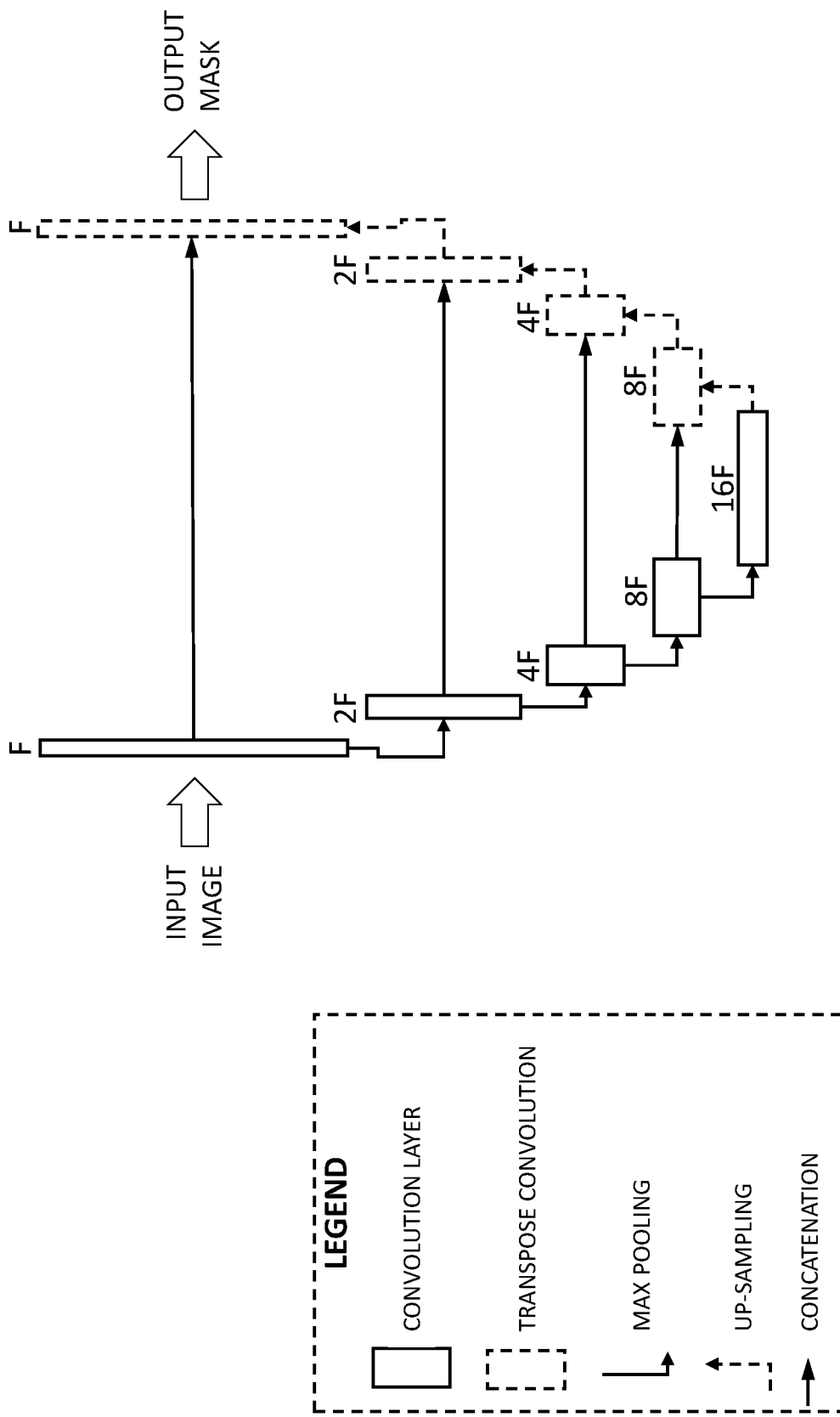
FIG. 4A is a schematic diagram of a U-Net neural network.
Figure 4B:
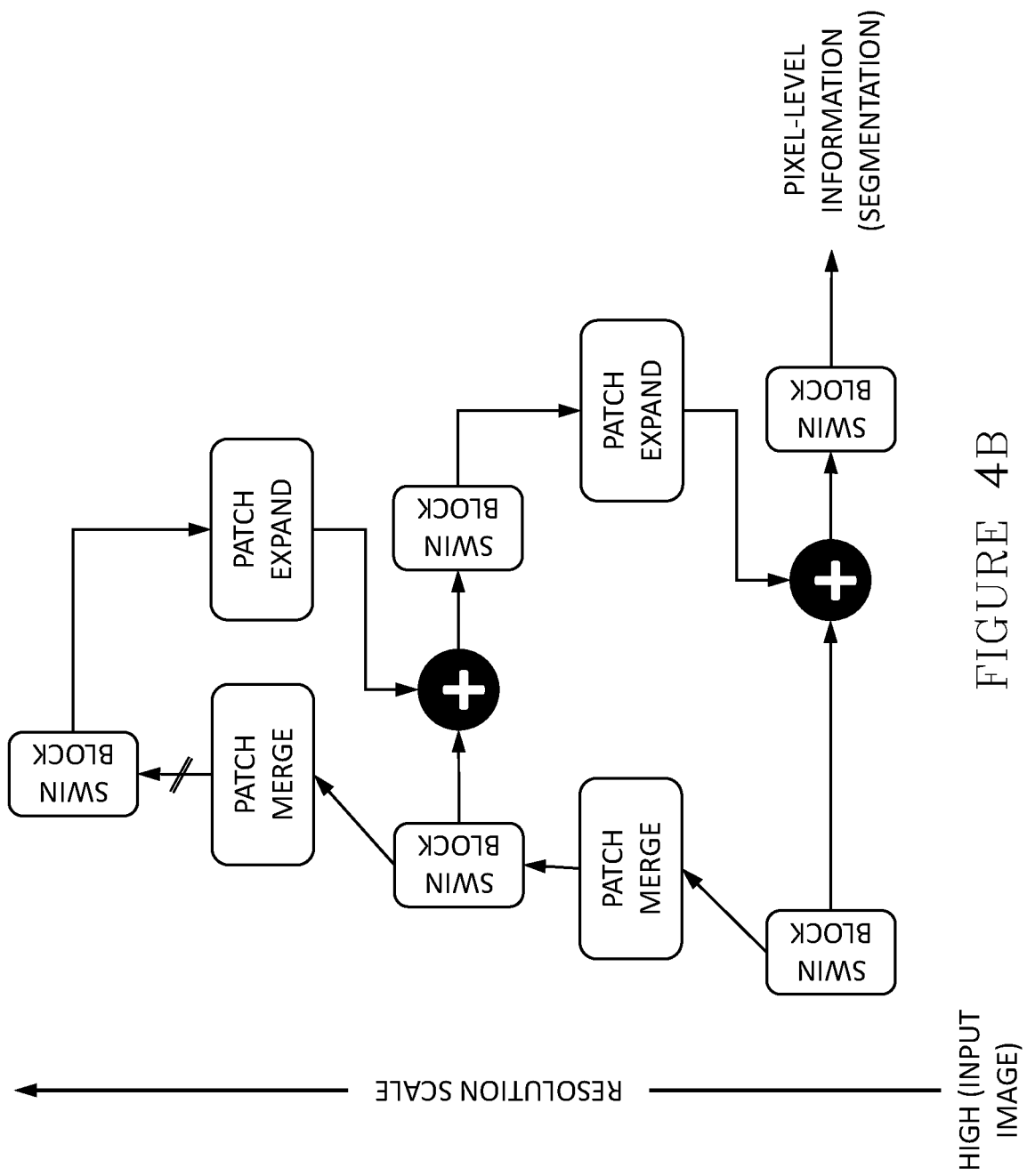
FIG. 4B is a schematic diagram of a SWIN U-Net neural network.

U-type networks have been proposed, such as U-Net (shown in FIG. 4A) (see, Ronneberger, Olaf, et al. (2015). U-Net: Convolutional Networks for Biomedical Image Segmentation. LNCS. 9351. 234-241. 10.1007/978-3-319-24574-4_28.), and SWIN U-Net (shown in FIG. 4B) (see, Hu Cao et al. "Swin-Unet: Unet-like Pure Transformer for Medical Image Segmentation". arXiv:2105.05537v1 [ees-s.IV] 12 May 2021.). U-Net like architectures consist of a contracting path and an expansive path. The contracting path is a typical convolutional network that consists of repeated application of convolutions, each followed by a rectified linear unit (ReLU) and a max pooling operation. During the contraction, the spatial information is reduced while feature information is increased. The expansive pathway combines the feature and spatial information through a sequence of up-convolutions and concatenations with high-resolution features from the contracting path.

However, U-type networks still requires localized annotation in the training materials to train the network to perform segmentation tasks, whereas classification tasks do not benefit from the multi-level context provided by the structure, because the classification output is found at the end of a contraction path, and before the expansive part. In addition, the main information flow in terms of number of layers involved in the processing is limited to either up or down scale.

Accordingly, in some embodiments, the present disclosure provides for a unified multigrid network (UMN) architecture which allows for a communication mechanism between all layers, from coarse to fine grids. Thus, every layer processes both coarse and fine representations in an efficient and unified manner.

Figure 2:
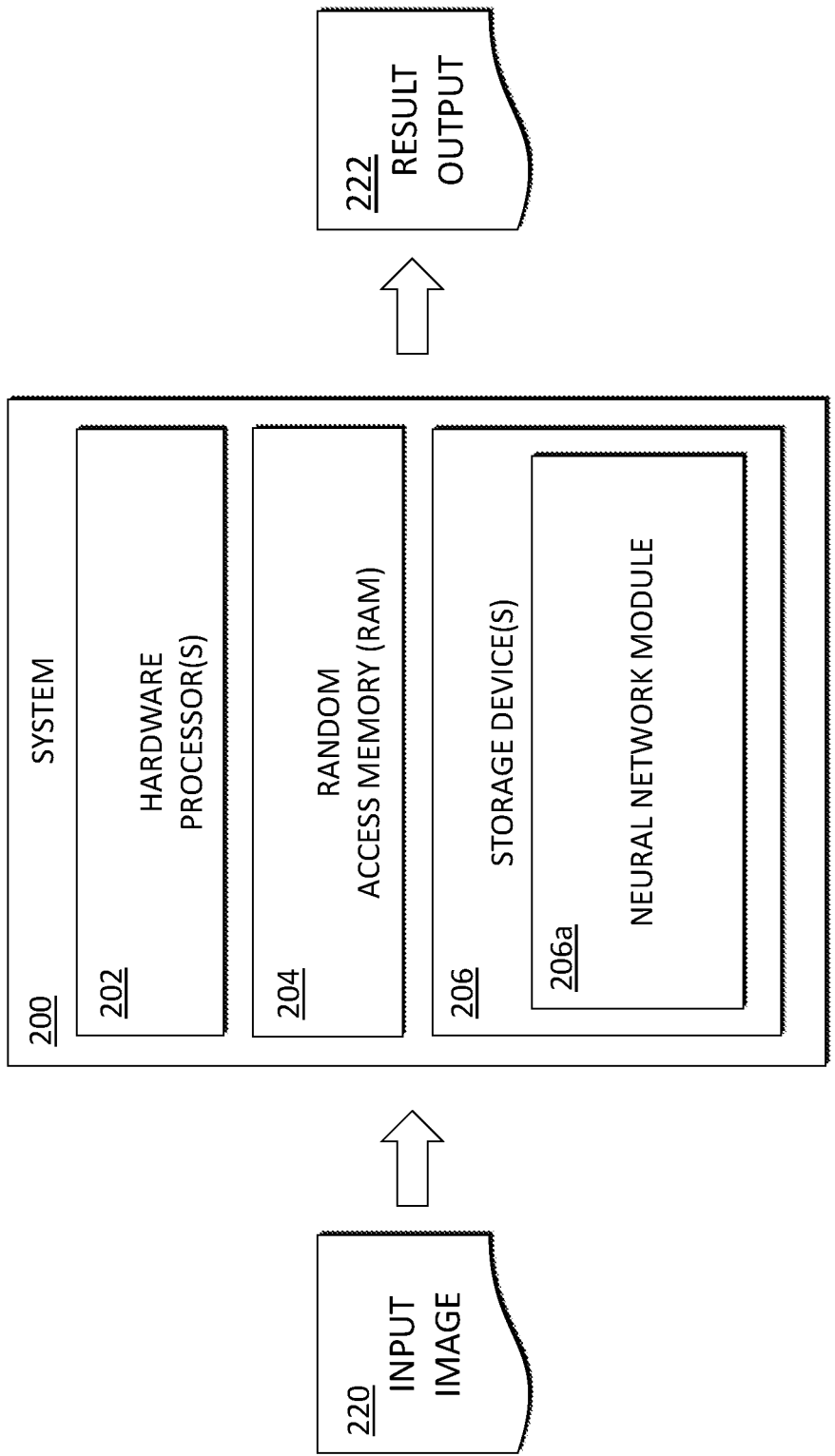
FIG. 2 is a block diagram of an exemplary system for executing computer vision tasks, using a Unified Multigrid Network (UMN) architecture based on multiple individual multilayer units arranged sequentially with skip-layers connecting between corresponding scale-levels of neighboring multilayer units, according to some embodiments of the present disclosure.

FIG. 2 is a block diagram of an exemplary system 200 for executing computer vision tasks, using a Unified Multigrid Network (UMN) architecture based on multiple individual multilayer units arranged sequentially with skip-layers connecting between corresponding scale-levels of neighboring multilayer units, according to some embodiments of the present disclosure.

System 200 may include one or more hardware processor(s) 202, a random-access memory (RAM) 204, and one or more non-transitory computer-readable storage device(s) 206. Storage device(s) 206 may have stored thereon program instructions and/or components configured to operate hardware processor(s) 202. The program instructions may include one or more software modules, such as a neural network module 206a. The software components may include an operating system having various software components and/or drivers for controlling and managing general system tasks (e.g., memory management, storage device control, power management, etc.), and facilitating communication between various hardware and software components. System 200 may operate by loading instructions of neural network module 206a into RAM 204 as they are being executed by processor(s) 202.

In some embodiments, the instructions of neural network module 206a may cause system 200 to implement and execute one or more neural network architectures, which may be trained to receive an input and to perform a variety of computer vision and/or other machine learning tasks with respect to the input.

System 200, as described herein, is only an exemplary embodiment of the present invention, and describes an environment in which an example method according to some embodiments of the present invention can be performed. System 200 in practice may be implemented in hardware only, software only, or a combination of both hardware and software. System 200 may have more or fewer components and modules than shown, may combine two or more of the components, or may have a different configuration or arrangement of the components. System 200 may include any additional component enabling it to function as an operable computer system, such as a motherboard, data busses, power supply, a network interface card, a display, an input device (e.g., keyboard, pointing device, touch-sensitive display), etc. (not shown). Moreover, components of system 200 may be co-located or distributed, or the system may be configured to run as one or more cloud computing "instances," "containers," "virtual machines," or other types of encapsulated software applications, as known in the art.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 3:
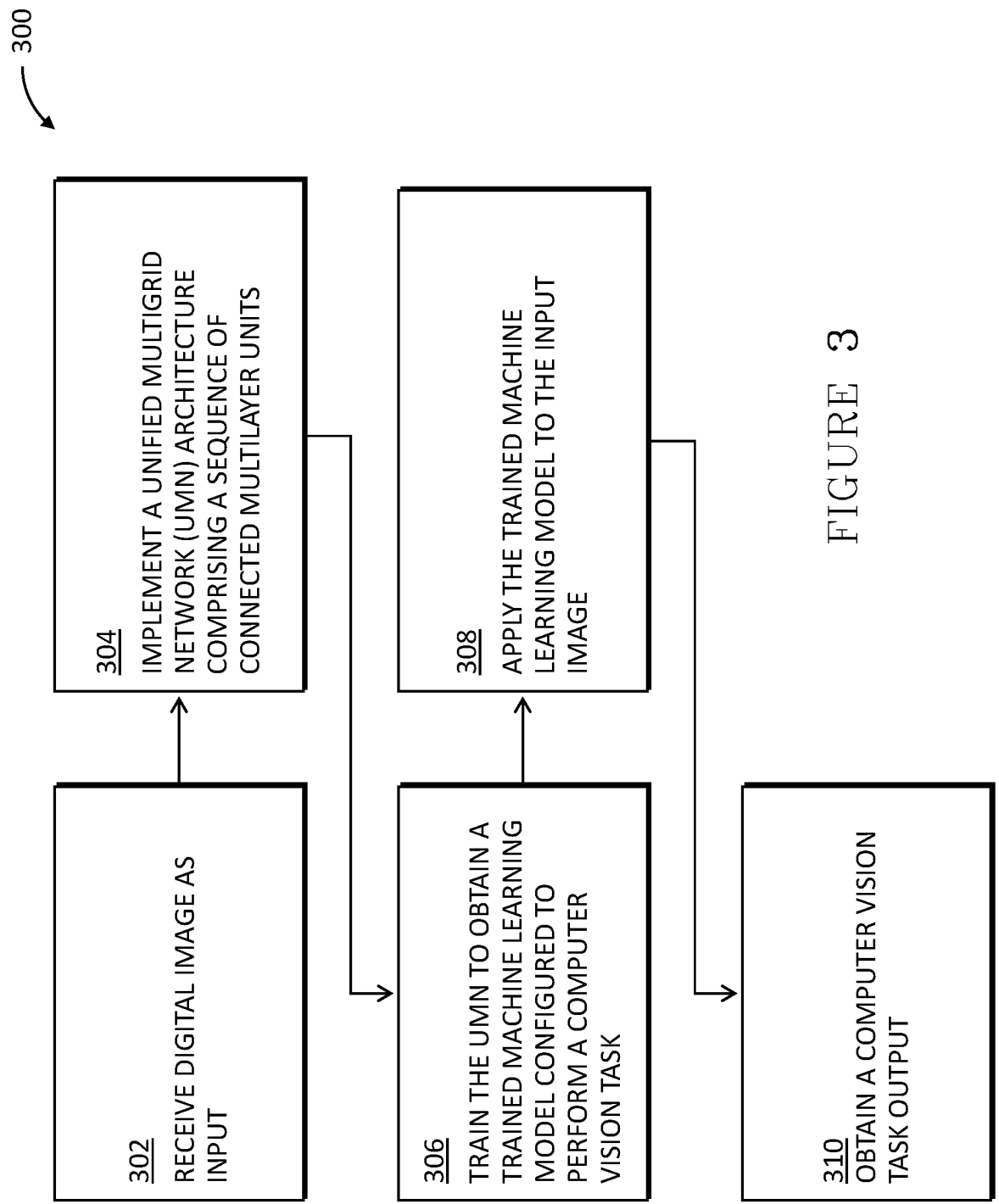
FIG. 3 is a flowchart of the functional steps in a method for executing computer vision tasks using a Unified Multigrid Network (UMN) architecture based on multiple individual multilayer units arranged sequentially with skip-layers connecting between corresponding scale-levels of neighboring multilayer units, according to some embodiments of the present disclosure.

The instructions of neural network module 206a will now be discussed with reference to the flowchart of FIG. 3, which illustrates the functional steps in a method 300 for executing computer vision tasks, using a Unified Multigrid Network (UMN) architecture based on multiple individual multilayer multi-scale units arranged sequentially with skip-layers connecting between corresponding scale-levels of neighboring multilayer units, according to some embodiments of the present disclosure.

The various steps of method 300 may either be performed in the order they are presented or in a different order (or even in parallel), as long as the order allows for a necessary input to a certain step to be obtained from an output of an earlier step. In addition, the steps of method 300 may be performed automatically (e.g., by system 200 of FIG. 2), unless specifically stated otherwise.

Processing begins at step 302, where system 200 receives, as input 220, a digital image at neural network module 206a, for performing one or more desired computer vision tasks with respect thereto. Input 220 may be a single static image or a frame of a video or input captured by a local camera.

In step 304, the instructions of neural network module 206a may cause system 200 to implement a Unified Multigrid Network (UMN) architecture of the present disclosure, wherein the UMN architecture is based on a series of multilayer multi-resolution neural network units, which may be U-shaped or otherwise (such as U-Net, SWIN U-Net, Feature Pyramid Networks, and the like). In some embodiments, the multiple multilayer multi-scale units are arranged sequentially with skip-layers connecting between corresponding scale-levels of adjacent multilayer units, such that an output of a specific scale layer in a first multilayer unit is connected to an input of a corresponding scale layer in an immediately-subsequent multilayer unit the sequence.

Figure 5A:
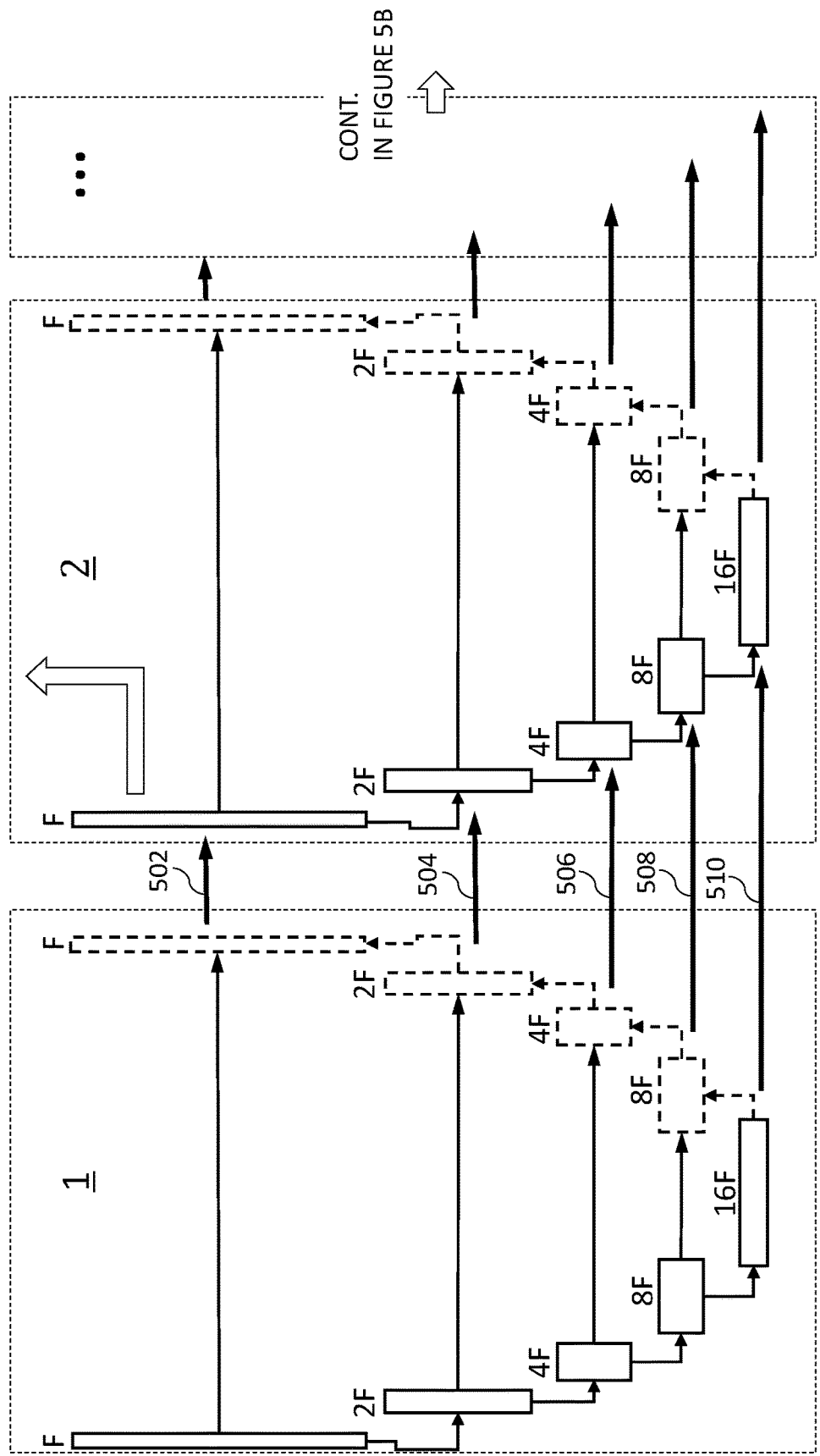
FIGS. 5A-5B are schematic depictions of an exemplary neural network architecture of the present disclosure, comprising a sequence of n individual multilayer units that are each a U-Net neural network [1 . . . n], according to some embodiments of the present disclosure.
Figure 5B:
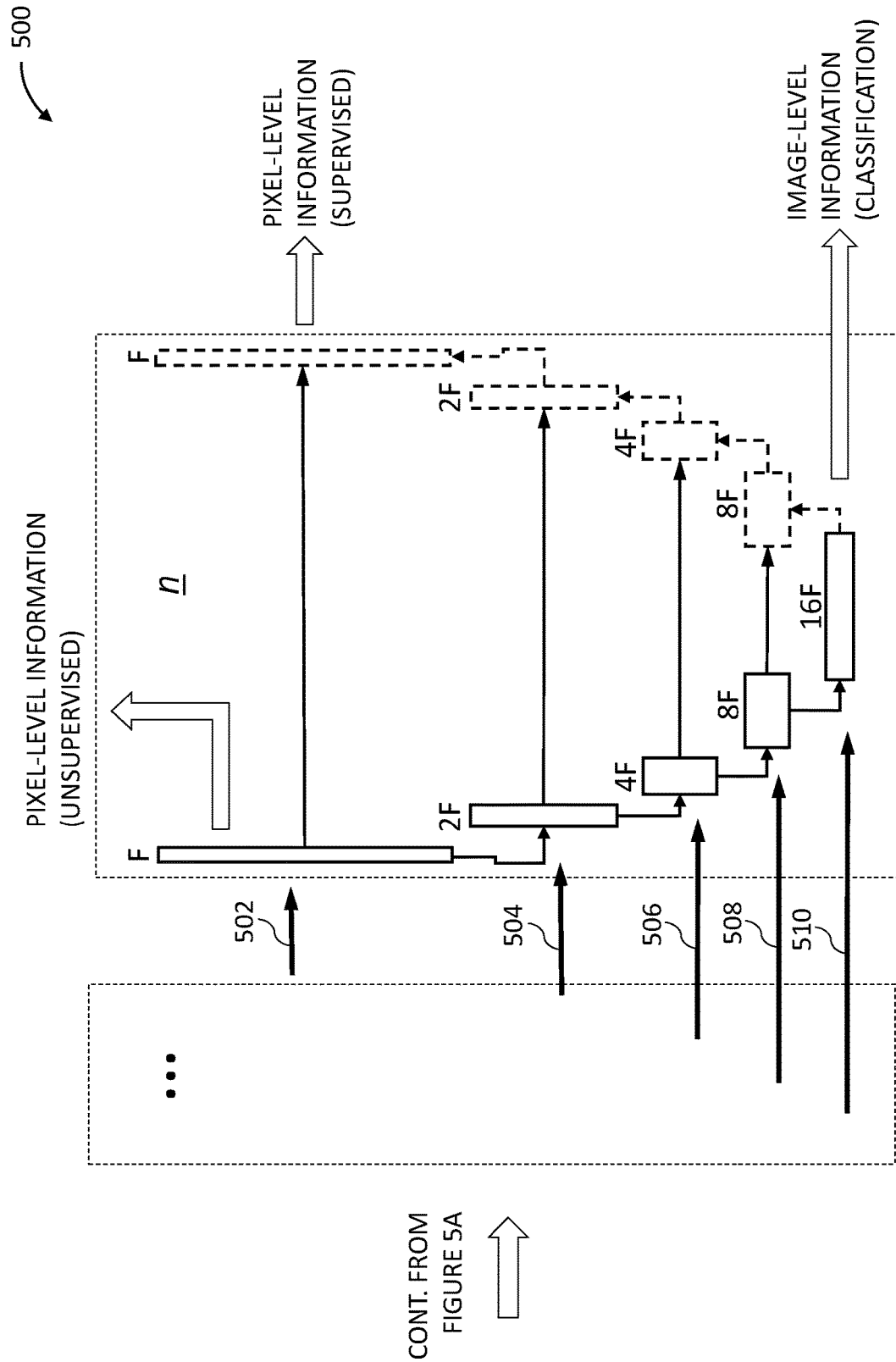

FIGS. 5A-5B are schematic depictions of an exemplary UMN architecture 500 of the present disclosure, comprising a sequence of n individual multilayer multi-scale units that are each a U-Net neural network [1 . . . n]. In some embodiments, UMN 500 may have two or more individual multilayer units, e.g., 3, 4, 5, 10, 15, or more individual multilayer units. In some embodiments, the individual multilayer units [1 . . . n] are arranged sequentially, with skip-layers connecting between corresponding scale-levels of neighboring multilayer units e.g., connections 502-510.

As noted above, the individual U-Net units each has a symmetric U-shaped architecture and consisting of two major parts—the left-hand side is a contracting path, which is constituted by the general convolutional process, and the right-hand side is an expansive path, which is constituted by transposed convolutional layers.

As can be seen, UMN 500 connects each layer of adjacent individual multilayer units, e.g., individual multilayer units 1→2, using connections between corresponding scale-level layers, e.g., connections 502-510. These connections continue throughout the sequence of individual multilayer units comprising UMN 500, e.g., individual multilayer units 2→3 through individual multilayer units (n−1)→n.

Thus, in FIG. 5A, an output of the expansive path scale layer F in multilayer unit 1 is connected 502 to an input of a corresponding contracting path scale layer F in multilayer unit 2, and an output of the expansive path scale layer 2F in multilayer unit 1 is connected 504 to an input of a corresponding contracting path scale layer 2F in multilayer unit 2, etc. Similarly, the output of the expansive path scale layer F in multilayer unit 2 is connected to an input of a corresponding contracting path scale layer F in multilayer unit 3 (not shown), and the output of the expansive path scale layer 2F in multilayer unit 2 is connected to an input of a corresponding contracting path scale layer 2F in multilayer unit 3 (not shown), etc.

Figure 6:
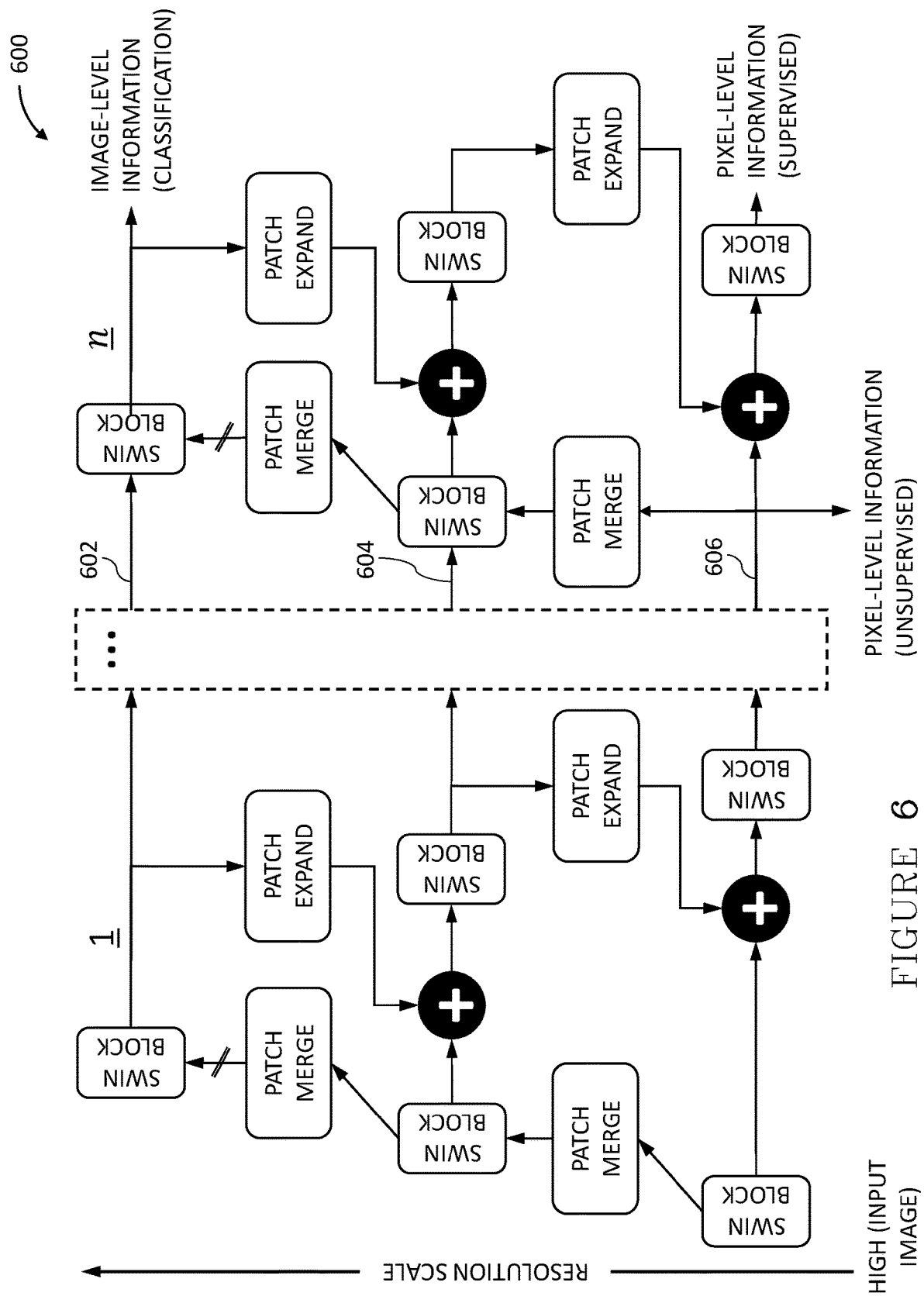
FIG. 6 is a schematic depiction of another exemplary neural network architecture of the present disclosure, comprising a sequence of n individual multilayer units that are each a SWIN U-Net neural network [1 . . . n], according to some embodiments of the present disclosure.

FIG. 6 is a schematic depiction of another exemplary UMN architecture 600 of the present disclosure, comprising a sequence of n individual multilayer multi-scale units that are each a SWIN U-Net neural network [1 . . . n]. In some embodiments, UMN 600 may have two or more individual multilayer multi-scale units, e.g., 3, 4, 5, 10, 15, or more individual multilayer units. In some embodiments, the individual multilayer multi-scale units [1 . . . n] are arranged sequentially, with skip-layers connecting between corresponding scale-levels of neighboring multilayer units, e.g., connections 602-606.

As can be seen, UMN 600 connects each SWIN block of adjacent individual multilayer units using connections between corresponding scale-level SWIN blocks, e.g., connections 602-606, wherein an output of a scale-level SWIN block is connected with a skip layer 602-606 to an input of a corresponding scale-level layer in an immediately-subsequent unit in the sequence. These connections continue throughout the sequence of individual multilayer units comprising UMN 600.

In some embodiments, in step 306, the instructions of neural network module 206a may cause system 200 to train UMN 500 or UMN 600, as the case may be, to perform one or more desired computer vision tasks.

In some embodiments, at least one of individual multilayer multi-scale units [1 . . . n] in the UMN architecture may be pre-trained to perform one or more computer vision tasks.

In some embodiments, the present disclosure may provide for an incremental training scheme for a UMN architecture of the present disclosure. Thus, in some embodiments, an incremental training scheme for a UMN architecture comprising n multilayer multi-scale units may begin by pre-training a first unit in the UMN architecture to perform a desired computer vision task. Then, a second unit may be added to the UMN sequence of units, wherein the added unit is not pre-trained to perform the desired task. The resulting 2-unit structure may then be trained to perform the desired task, after which a third non-pre-trained unit may be added, wherein the resulting 3-unit UMN structure may again be trained, and so on, until all n units have been added, and the final structure is trained a final time to perform the desired task. In some embodiments, each newly-added unit may be added before or subsequent to the existing UMN structure. In some embodiments, some of the added units may be pre-trained to perform a default task, or randomly initialized.

In some embodiments, UMN 500/600 may be trained, at a training stage, on a training dataset comprising a plurality of images and associated class labels, to create a machine learning model configured to perform one or more desired computer vision tasks. The training may utilize one or more specific loss functions for optimization of the trained machine learning model to the desired one or more tasks.

For example, at a training stage, various output layers of UMN 500/600 may be assigned a relevant loss function for optimization to the desired task. For example, as can be seen in FIGS. 5B and 6, for a whole-image classification task, the low-scale whole-image level output from the last individual multilayer unit n may be assigned a classification loss function. In such case, pixel-level output from the penultimate individual multilayer unit n−1 may also be output, and undergo an unsupervised segmentation method (e.g. clustering in representation-dimension, or representation and location dimension), to provide task-related segmentation or explanation.

Alternatively, when localized pixel-level annotation is available for training purposes, at least some of the input images, a pixel-level detection output may be attached to the high-scale level of the last individual multilayer unit n, with a loss function that only activates when segmentation information is available.

In other examples, for object detection or segmentation tasks, the high-scale pixel-level output from the last individual multilayer unit n may be assigned a segmentation loss function.

In some embodiments, in step 308, the instructions of neural network module 206a may cause system 200 to apply, at an inference stage, the machine learning model trained in step 306, to input image 220 (shown in FIG. 2). In some embodiments, applying the trained machine learning model, which benefits from the unique structure of UMN 500 shown in FIGS. 5A-5B or UMN 600 shown in FIG. 6, comprises implementing multiple layers of convolutions and reverse connections to generate feature maps.

In some embodiments, in step 310, the instructions of neural network module 206a may cause system 200 to output a computer vision task result 222.

For example, in the case of whole-image classification, result output 222 may be a whole-image classification label and confidence score. In some embodiments, in the case of semantic segmentation tasks, result output 222 may be a per-pixel classification label and confidence score. In some embodiments, in the case of object detection tasks, result output 222 may be a bounding box encompassing a detected object and a confidence score.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, a field-programmable gate array (FPGA), or a programmable logic array (PLA) may execute the computer readable program instructions by utilizing state information of the computer readable program instructions to personalize the electronic circuitry, in order to perform aspects of the present invention. In some embodiments, electronic circuitry including, for example, an application-specific integrated circuit (ASIC), may be incorporate the computer readable program instructions already at time of fabrication, such that the ASIC is configured to execute these instructions without programming.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the description and claims, each of the terms "substantially," "essentially," and forms thereof, when describing a numerical value, means up to a 20% deviation (namely, ±20%) from that value. Similarly, when such a term describes a numerical range, it means up to a 20% broader range—10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A system comprising:
   at least one hardware processor; and
   a non-transitory computer-readable storage medium having stored thereon program instructions, the program instructions executable by the at least one hardware processor to:
   receive, as input, an image,
   provide a neural network structure comprising a plurality of multilayer multi-scale neural networks, wherein the plurality of multilayer multi-scale neural networks are arranged sequentially, by laterally connecting corresponding scale-level layers between each two adjoining multilayer multi-scale neural networks in said sequence, and
   at a training stage, training said neural network structure on a training dataset, to obtain a trained machine learning model configured to perform a computer vision task which comprises outputting at least one of:
   (i) a classification of said image into one class of a set of two or more classes,
   (ii) a segmentation of a least one object in said image, and
   (iii) a detection of at least one object in said image.

2. The computer-implemented method of claim 1, wherein each of said plurality of multilayer multi-scale neural networks comprises a bottom-up pathway and a top-down pathway, which compute feature maps of said input image at multiple scales.

3. The system of claim 1, wherein each of said plurality of multilayer multi-scale neural networks is one of: a U-Net neural network, a Feature Pyramid Network, and a SWIN U-Net neural network.

4. The system of claim 1, wherein said classification of said image into said one class of said set of two or more classes is obtained by training said neural network structure using a classification optimization scheme, using an output of a low-scale layer of a last one of said multilayer multi-scale neural networks in said sequence.

5. The system of claim 1, wherein said segmentation of a least one object in said image and said detection of at least one object in said image are each obtained by training said neural network structure using a segmentation optimization scheme, using an output of a high-scale layer of a last one of said multilayer multi-scale neural networks in said sequence.

6. The system of claim 5, wherein said training comprises a training dataset comprising a plurality of images, wherein at least some of said plurality of images comprises pixel-level annotation.

7. The system of claim 1, wherein said segmentation of a least one object in said image and said detection of at least one object in said image are each obtained by training said neural network structure using a segmentation optimization scheme, using an output of a high-scale layer of a penultimate one of said multilayer multi-scale neural networks in said sequence.

8. The system of claim 7, wherein said training comprises a training dataset comprising a plurality of images, wherein said plurality of images do not comprise pixel-level annotation.

9. A computer-implemented method comprising:
   receiving, as input, an image;
   providing a neural network structure comprising a plurality of multilayer multi-scale neural networks, wherein the plurality of multilayer multi-scale neural networks are arranged sequentially, by laterally connecting corresponding scale-level layers between each two adjoining multilayer multi-scale neural networks in said sequence; and at a training stage, training said neural network structure on a training dataset, to obtain a trained machine learning model configured to perform a computer vision task which comprises outputting at least one of:
(i) a classification of said image into one class of a set of two or more classes,
(ii) a segmentation of a least one object in said image, and
(iii) a detection of at least one object in said image.

10. The computer-implemented method of claim 9, wherein each of said plurality of multilayer multi-scale neural networks comprises a bottom-up pathway and a top-down pathway, which compute feature maps of said input image at multiple scales.

11. The computer-implemented method of claim 9, wherein each of said plurality of multilayer multi-scale neural networks is one of: a U-Net neural network, a Feature Pyramid Network, and a SWIN U-Net neural network.

12. The computer-implemented method of claim 9, wherein said classification of said image into said one set of said set of two or more classes is obtained by training said neural network structure using a classification optimization scheme, using an output of a low-scale layer of a last one of said multilayer multi-scale neural networks in said sequence.

13. The computer-implemented method of claim 9, wherein said segmentation of a least one object in said image and said detection of at least one object in said image are each obtained by training said neural network structure using a segmentation optimization scheme, using an output of a high-scale layer of a last one of said multilayer multi-scale neural networks in said sequence.

14. The computer-implemented method of claim 13, wherein said training comprises a training dataset comprising a plurality of images, wherein at least some of said plurality of images comprises pixel-level annotation.

15. The computer-implemented method of claim 9, wherein said segmentation of a least one object in said image and said detection of at least one object in said image are each obtained by training said neural network structure using a segmentation optimization scheme, using an output of a high-scale layer of a penultimate one of said multilayer multi-scale neural networks in said sequence.

16. The computer-implemented method of claim 15, wherein said training comprises a training dataset comprising a plurality of images, wherein said plurality of images do not comprise pixel-level annotation.

17. A computer program product comprising a non-transitory computer-readable storage medium having program instructions embodied therewith, the program instructions executable by at least one hardware processor to:
receive, as input, an image;
provide a neural network structure comprising a plurality of multilayer multi-scale neural networks, wherein the plurality of multilayer multi-scale neural networks are arranged sequentially, by laterally connecting corresponding scale-level layers between each two adjoining multilayer multi-scale neural networks in said sequence; and
at a training stage, training said neural network structure on a training dataset, to obtain a trained machine learning model configured to perform a computer vision task which comprises outputting at least one of:
(i) a classification of said image into one class of a set of two or more classes,
(ii) a segmentation of a least one object in said image, and
(iii) a detection of at least one object in said image.

18. The computer-implemented method of claim 17, wherein each of said plurality of multilayer multi-scale neural networks comprises a bottom-up pathway and a top-down pathway, which compute feature maps of said input image at multiple scales.

19. The computer program product of claim 17, wherein each of said plurality of multilayer multi-scale neural networks is one of: a U-Net neural network, a Feature Pyramid Network, and a SWIN U-Net neural network.

20. The computer program product of claim 17, wherein:
(i) said classification of said image into said one class of said set of two or more classes is obtained by training said neural network structure using a classification optimization scheme, using an output of a low-scale layer of a last one of said multilayer multi-scale neural networks in said sequence;
(ii) said segmentation of a least one object in said image and said detection of at least one object in said image are each obtained by training said neural network structure using a segmentation optimization scheme, using an output of a high-scale layer of a last one of said multilayer multi-scale neural networks in said sequence; and
(iii) said segmentation of a least one object in said image and said detection of at least one object in said image are each obtained by training said neural network structure using a segmentation optimization scheme, using an output of a high-scale layer of a penultimate one of said multilayer multi-scale neural networks in said sequence.

* * * * *